(12) United States Patent
Shibata et al.

(10) Patent No.: US 6,775,586 B2
(45) Date of Patent: Aug. 10, 2004

(54) NUMERICAL CONTROLLER

(75) Inventors: Nobuhiro Shibata, Yokohama (JP); Toshiaki Otsuki, Hino (JP)

(73) Assignee: Fanuc, Ltd., Yamanashi (JP)

( * ) Notice: Subject to any disclaimer, the term of this patent is extended or adjusted under 35 U.S.C. 154(b) by 0 days.

(21) Appl. No.: 10/270,684

(22) Filed: Oct. 16, 2002

(65) Prior Publication Data

US 2003/0120376 A1 Jun. 26, 2003

(30) Foreign Application Priority Data

Oct. 16, 2001 (JP) ........................................ 2001/318147

(51) Int. Cl.[7] .......................... G05B 19/19; G06F 19/00
(52) U.S. Cl. ........................ 700/189; 700/117; 700/188; 409/183
(58) Field of Search .............................. 700/90, 95, 117, 700/159, 186–189, 245; 409/64, 183, 199; 74/490.01

(56) References Cited

U.S. PATENT DOCUMENTS

| | | | | |
|---|---|---|---|---|
| 5,303,333 A | * | 4/1994 | Hoos | 700/245 |
| 5,558,557 A | * | 9/1996 | Dashevsky | 451/10 |
| 5,713,253 A | * | 2/1998 | Date et al. | 82/1.11 |
| 6,048,143 A | * | 4/2000 | Chang et al. | 409/201 |
| 6,230,070 B1 | * | 5/2001 | Yodoshi | 700/162 |

* cited by examiner

Primary Examiner—Jayprakash N. Gandhi
(74) Attorney, Agent, or Firm—Staas & Halsey LLP

(57) ABSTRACT

A numerical controller capable of precisely controlling a machine tool having an axis for turning a table with a simple machining program and easily coping with variation of a tool length. A machining path is commanded in a workpiece coordinate system turning with a table. The commanded machining path for linear-motion axes is interpolated based on a commanded machining velocity, to obtain interpolated positions on the machining path. Also, the commanded motions for rotational-motion axes are interpolated to obtain interpolated positions for the rotational-motion axes. The interpolated position for the linear-motion axes is corrected based on the interpolated position of the rotational-motion axes. The servomotors for the linear-motion axes are driven based on the corrected interpolated positions and the servomotors for the rotational-motion axes are driven based on the interpolated positions of the rotational-motion axes. Since the workpiece coordinate system turns with the table, a machining shape defined in the workpiece coordinate system is realized on the workpiece turning with table.

12 Claims, 13 Drawing Sheets

NUMERICAL CONTROLLER

BACKGROUND OF THE INVENTION

1. Field of the Invention

The present invention relates to a numerical controller for controlling a machine having an axis for turning a table on which a workpiece is mounted.

2. Description of Related Art

There are known a machine tool having a plurality of linear motion axes and an axis for turning a table for mounting a workpiece, and further having an axis for tilting a tool head or the table. For example, in a five-axis machine tool as shown in FIG. 1, a table 1 is arranged movable in directions of rectangular axes of X, Y and a tool head 2 is arranged movable in a direction of a Z-axis perpendicular to the X- and Y-axes, the table 1 is turned around a C-axis parallel to the Z-axis and further the tool head 2 is arranged to tilt around an A-axis parallel to the X-axis. Thus, a workpiece 3 mounted on the table 1 is machined by a tool of the tool head 2 by driving the five axes.

Further, in a five-axis machine tool as shown in FIG. 2, a tool head 2 is arranged movable in directions of three rectangular axes of X, Y, Z and the table 1 is arranged to turn around a C-axis on the Y-Z-plane and further tilt around an A-axis parallel to the X-axis, to machine a workpiece 3 mounted on the table 1 by a tool of the tool head 2.

It has been necessary to create a machining program including commands for minute segments and issue the commands to servo systems for the respective axes using a CAM (computer-aided manufacturing) system for moving a distal end of the tool with respect to the workpiece 3 along a predetermined path at a predetermined velocity while driving the A- and C-axes.

Specifically, in a machine tool having a C-axis for turning the table 1 and an A-axis for swinging a tool head 2 in addition to linear-motion axes of X, Y, Z, as shown in FIG. 3, it has been hardly possible to perform a cutting operation along a straight line L on the workpiece 3 while turning the table 1 and varying an inclination angle of the tool head 2, as shown in FIG. 4, by commanding a motion path of the straight line L by a single block. Thus, it has been necessary to divide the motion path into a plurality of segments and prepare commands for the plurality of segments. In FIG. 3, Co presents a center of turning of the table 3, CS represents a reference position of angular position of the C-axis, the table 3 is turned so that a commanded angular position of the C-axis is moved to the reference position CS. A controlled point P of the tool head 2 is set at a center of turning of the tool.

Example of Conventional Program Commands

| | | | | | | | |
|---|---|---|---|---|---|---|---|
| N200 | G01 | G90 | X Xc0 | Y Yc0 | Z Zc0 | A 60.0 | C30.0; |
| N 301 | X Xc1 | Y Yc1 | Z Zc1 | A 45.0 | C90.0; | | |
| N 302 | X Xc2 | Y Yc2 | Z Zc2 | A 30.0 | C150.0; | | |

In the block of N200, the code G01 commands cutting feed, the code G90 commands use of absolute value. According to the commands of the blocks, the respective axes of the machine tool are operated as shown in FIGS. 5a–5c. FIG. 5a shows a state in which the tool 2 is positioned at a commanded position by the first block "N200", i.e. X coordinate value of Xc0, Y coordinate value of Yc0, Z coordinate value of Zc0, A-axis angle of 60 degree and C-axis angle of 30 degree, which is a machining start position of the second block "N 301". FIG. 5b shows a state in which the tool is positioned at a commanded position by the second block "N301", i.e. X coordinate value of Xc0, Y coordinate value of Yc0, Z coordinate value of Zc0, A-axis angle of 60 degree and C-axis angle of 30 degree, which is an end position of the second block "N 301" and also a start point of the third block "N 302". The machining is performed by the second block as indicated by the solid line. FIG. 5c shows a state in which the tool is positioned at an end point of the third block "N 301" to terminate the machining along the straight line L.

In the above example, the cutting operation along the straight line L is divided into only two blocks, but actually it is hardly possible to precisely machine the workpiece along the straight line L by the two blocks. Thus, it has been necessary to divide the motion path into a large number of blocks.

FIG. 4 is depicted with the C-axis stationary and the tool head 2 moved along the C-axis, and actually the C-axis is moved and the tool head as shown in FIG. 5. In these figures, as viewed in the direction of Z-axis.

The above example is directed to the machine tool having the C-axis for turning the table 1 and the A-axis for tilting the tool head 1 in addition to the linear-motion axes. The machine tool may have two axes for turning and for tilting the table 1 in addition to the linear-motion axes.

As described, in the machine tool having one axis for turning the table 1 and one axis for swinging the tool head 2, or a machine tool having two rotational-motion axes for turning and for tilting the table 1, it is necessary to prepare a machining program commanding a minutely divided segments by the CAM system for performing the machining along a predetermined path at a predetermined velocity while turning the table.

Therefore, there arise the following problems.

1) A CAM system is necessary.

2) It is necessary to prepare a lengthy machining program including a large number of minute segments and thus a storage device of large capacity for storing the lengthy machining program is required.

3) Because of the lengthy machining program, it is necessary to rapidly transfer data from an external device to the CNC (Computerized Numerical Control) device in a DNC (Direct Numerical Control) operation in which the machining is performed while transferring a program from the external device to the CNC.

4) It takes a long time for the CNC device to analyze the lengthy program to make it difficult to perform the machining smoothly.

5) It is necessary to create a new machining program for using a tool having a different length.

SUMMARY OF THE INVENTION

An object of the present invention is to provide a numerical controller capable of precisely controlling a machine tool having an axis for turning a table with a simple machining program and easily coping with variation of a tool length.

A numerical controller of the present invention is provided for controlling a machine tool having a plurality of linear-motion axes and at least one rotational-motion axis for a table on which a workpiece is mounted, and comprises: motion commanding means for providing a command of motion path for the linear-motion axes, a command of velocity of the tool with respect to the workpiece, and a command of rotational motion of the rotational-motion axis for defining an orientation of the tool with respect to the table; coordinate system defining means for defining a coordinate system with respect to the table; first interpolation means for performing interpolation on the commanded motion path using the commanded velocity in the coordinate system to obtain interpolated position data for the linear-motion axes; second interpolation means for interpolating the rotational motion of the rotational-motion axis based on the commanded motion path and the commanded velocity to obtain interpolated position data for the rotational-motion axis; and correction means for correcting the interpolated position data obtained by the first interpolation means based on the interpolated position data for the rotational-motion axis, wherein motion commands for the linear-motion axes are outputted based on the interpolated position data for the linear-motion axes corrected by the correction means, and motion commands for the rotational-motion axis are outputted based on the interpolated position data for the rotational-motion axis so that a tool center point set to the tool is moved along the commanded motion path at the commanded velocity.

The machine tool may have an axis for tilting said tool with respect to the table as the rotational-motion axis. Further, the machine tool may have an axis for tilting said table with respect to said tool as the rotational-motion axis.

The correction means may correct the interpolated position data for the linear-motion axis using a predetermined tool length compensation amount and/or a predetermined tool radius compensation amount.

The orientation of tool may be provided as a command for rotational position of said rotational-motion axis, or as an orientation vector.

The coordinate system defining means may define a coordinate system which turns with said table, and the motion commanding means may provide the command for motion path of the linear-motion axis in the coordinate system which turns with the table. The motion commanding means may provide the command of motion path for the linear-motion axes by transforming a command of motion path for the linear-motion axes commanded in a coordinate system which does not turn with the table into a command of motion path in a coordinate system which turns with the table.

The tool center point may be set at a tip of the tool. Further, the tool center point may be set at a center of a semispherical end surface of a ball end mill tool or a cutting point on the semispherical end surface of the ball end mill tool. Furthermore, the tool center point may be set at a center of an end face of a flat-end mill tool or a cutting point on the end face of the flat end mill tool.

The machine tool may have a plurality of linear-motion axes and at least one rotational-motion axis for a workpiece holding stock to which a workpiece is fixed. In this case, the motion commanding means provides a command of rotational motion of the rotational-motion axis for defining an orientation of the tool with respect to the workpiece holding stock, and the coordinate system defining means defines a coordinate system with respect to the workpiece holding stock.

DETAILED DESCRIPTION OF THE PREFERRED EMBODIMENTS

Figure 6:
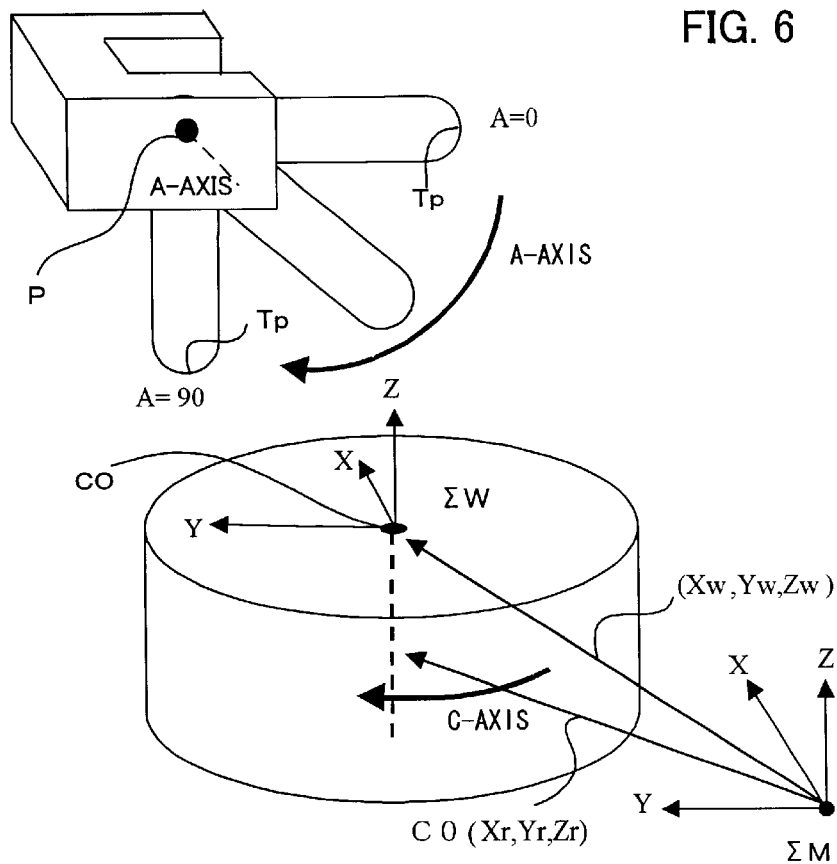
FIG. 6 is a schematic view showing a principle of the present invention in an embodiment for controlling the machine tool having the A-axis for tilting the tool head and the C-axis for tuning the table.

A principle of the present invention will be described with respect to a machine tool having two rotational motion axes of a C-axis for turning a table and an A-axis for tilting a tool head in addition to linear motion axes of X, Y and Z, as shown in FIG. 6. The principle is applicable to a machine tool having rotational-motion axes other than the A-axis and C-axis as shown in FIG. 6 and a machine tool having two axes for turning and tilting the table. In this example, a tool center point Tp representing a position of a tool is set at a tip of the tool.

In this control of the tool center point, a workpiece coordinate system ΣW is defined by setting a position (Xw, Yw, Zw) of an origin thereof in a machine coordinate system ΣM. A controlled point P is set at a center of swinging motion of the tool head and a distance between the controlled point P and the tool center point Tp is stored as a tool length compensation amount H.

A position (Xs, Ys, Zs) of the tool center point Tp at a start of machining in the workpiece coordinate system ΣW is obtained according to the following equations (1)–(3) based on a position (Xm, Ym, Zm) of the controlled point P at the start of machining in the machine coordinate system ΣM, an orientation of the tool (Am, Cm) and the tool length compensation amount H. Since the orientation of the tool is defined relatively to a workpiece on the table, the orientation of the tool is determined by an angle Am of rotation of the A-axis for tiling the tool and an angle Cm of rotation of the C-axis for turning the table 1 (workpiece 3). Angular positions (As, Cs) of the rotational-motion axes at the start of machining is defined as angular positions (Am, Cm) in the machine coordinate system ΣM.

The position (Xm, Ym, Zm, Am, Cm) of the controlled point P including the angular positions of the rotational-motion axes at the start of machining in the machine coordinate system ΣM is stored as a position (Xo, Yo, Zo, Ao, Co) of the controlled point P at the preceding interpolation period for interpolating processing as described later, and the position (Xs, Ys, Zs) of the tool center point Tp at the start of machining in the workpiece coordinate system ΣW is stored as a position (Xj, Yj, Zj) of the tool center point Tp at the preceding interpolation period.

$$Xs = Xm - Xw \quad (1)$$

$$Ys = Ym - H^*\cos(Am) - Yw \quad (2)$$

$$Zs = Zm - H^*\sin(Am) - Zw \quad (3)$$

The angular position Cm of the C-axis at the start of machining is stored as Cz. The coordinate value (Xr, Yr, Zr) of a center of turning of the table in the machine coordinate system ΣM is stored.

In addition, the tool center point control may be started by shifting the position (Xm, Ym, Zm) of the controlled point P of the linear-motion axes in the machine coordinate system ΣM to be positioned at the tool center point Tp in the workpiece coordinate system at the start of machining. In this case, a tool length compensation vector V(Vx, Vy, Vz) is obtained using the orientation of the tool (Am, Cm) and the tool compensation amount H according to the following equations (4)–(6).

$$Vx = 0 \quad (4)$$

$$Vy = H^*\cos(Am) \quad (5)$$

$$Vz = H^*\sin(Am) \quad (6)$$

The position (Xw, Yw, Zw) of the origin of the workpiece coordinate system ΣW is subtracted from the position (Xm, Ym, Zm) of the controlled point P in the machine coordinate system ΣM when the coordinate values of the X, Y and Z axes are shifted by the vector V, to obtain the position (Xs, Ys, Zs) of the tool center position at the start of machining in the workpiece coordinate system ΣM, according to the following equations. (7)–(9)

$$Xs = Xm - Xw \quad (7)$$

$$Ys = Ym - Yw \quad (8)$$

$$Zs = Zm - Zw \quad (9)$$

After the machining start position (Xs, Ys, Zs) of the tool center point Tp in the workpiece coordinate system ΣM is thus obtained in the above-described manner, commands in the machining program are regarded as commands in the workpiece coordinate system ΣW (the commands are prepared as commands in the workpiece coordinate system ΣW) and interpolation processing is performed based on a velocity F commanded in the workpiece coordinate system ΣW. An interpolated position (Xc, Yc, Zc Ac, Cc) of the controlled point P in the machine coordinate system ΣM is obtained at every interpolation period Δt as follows;

First, an interpolation of the tool center point Tp for the linear axes is performed based on the commanded velocity F to obtain an interpolation point (Xi, Yi, Zi) on the workpiece coordinate system ΣW. A length K1 of movement of the tool center point Tp in the interpolation processing period Δt is expressed by the following equation (10).

$$K1 = \Delta t^* F \quad (10)$$

A length of the block from the start position (Xs, Ys, Zs) to the end position (Xe, Ye, Ze) is obtained by the following equation (11).

$$D = \sqrt{((Xe-Xs)^2 + (Ye-Ys)^2 + (Ze-Zs)^2)} \quad (11)$$

Thus, an interpolated position of the tool center point Tp in the workpiece coordinate system ΣM is obtained according the following equations using the preceding interpolation point (Xj, Yj, Zj). It should be noted that (Xj, Yj, Zj)=(Xs, Ys, Zs) at the start of machining.

$$Xi = K1^*[(Xe-Xs)/D] + Xj \quad (12)$$

$$Yi = K1^*[(Ye-Ys)/D] + Yj \quad (13)$$

$$Zi = K1^*[(Ze-Zs)/D] + Zj \quad (14)$$

Interpolations for the rotational-motion axes of the A-axis and the C-axis are performed from a start position (As, Cs) to the end position (Ae, Ce) to obtain an interpolation point (Ai, Ci). The position of the interpolation point (Ai, Ci) is distributed proportionally at the same rate as that of distribution of the interpolation of movement of the tool center point Tp from the start position (Xs, Ys, Zs) to the end position (Xe, Ye, Ze).

Using a ratio K2 expressed by the following equation (15), $$K2 = [\sqrt{(Xi-Xs)^2 + (Yi^2-Ys)^2 + (Zi-Zs)^2}]/[\sqrt{(Xe-Xs)^2 + (Ye-Ys)^2 + (Ze-Zs)^2}] \quad (15)$$

the interpolated position of the A-axis and the C-axis are obtained according to the following equations (16)–(17).

$$Ai = K2^*(Ae-As) + As \quad (16)$$

$$Ci = K2^*(Ce-Cs) + Cs \quad (17)$$

The interpolation point (Xi, Yi, Zi) of the tool center point Tp for the linear-motion axes in the workpiece coordinate system ΣW is corrected by the turning angle of the table and transformed at every interpolation processing period, to obtain a coordinate position (Xa, Ya, Za) of the tool center point Tp in the machine coordinate system ΣM according to the following equations (18)–(20).

$$Xa = (Xw+Xi-Xr)^*\cos(-Ci+Cz) + (Yw+Yi-Yr)^*\sin(-Ci+Cz) + Xr \quad (18)$$

$$Ya = (Xw+Xi-Xr)^*\sin(-Ci+Cz) + (Yw+Yi-Yr)^*\cos(-Ci+Cz) + Yr \quad (19)$$

$$Za = Zw + Zi \quad (20)$$

The tool length compensation vector V(Vx, Vy, Vz) is calculated using the interpolated position (Ai) of the A-axis and the tool length compensation mount H according to the following equations (21)–(23) at every interpolation processing period.

$$Vx=0 \quad (21)$$

$$Vy=H^*\cos(Ai) \quad (22)$$

$$Vz=H^*\sin(Ai) \quad (23)$$

The position (Xc, Yc, Zc) of the controlled point P in the machine coordinate system $\Sigma M$ is obtained by adding the tool length compensating vector V to the position (Xa, Ya, Za) of the tool center point Tp in the machine coordinate system $\Sigma M$ according to the following equation (24) at every interpolation processing period. Further, the values of (Ai, Ci) are stored as (Ac, Cc).

$$(Xc, Yc, Zc)=(Xa, Ya, Za)+(Vx, Vy, Vz) \quad (24)$$

Thus, the interpolated position (Xc, Yc, Zc) of the controlled point P in the machine coordinate system $\Sigma M$ is obtained.

A difference between the interpolated position (Xc, Yc, Zc) of the controlled point P in the present interpolation period and the interpolated position (Xo, Yo, Zo) of the controlled point P in the preceding processing period is outputted to the servo systems for the linear axes of X, Y, Z as motion amounts. Also, differences between the interpolated positions (Ac, Cc) of the rotational-motion axes and the interpolated positions (Ao, Co) in the preceding interpolation period are outputted to the servo systems of the rotational-motion axes of A and C, respectively.

Then, the interpolated position (Xc, Yc, Zc) of the controlled point P are stored as the preceding interpolated position (Xo, Yo, Zo) and the interpolated angular positions (Ac, Cc) of the rotational-motion axes are stored as the preceding interpolated positions (Ao, Co) for use in the interpolation processing in the next processing period.

In the case where the next command is of a command to terminate the tool center point control, the commands obtained by the following equations (25)–(27) are regarded as programmed commands (Xp, Yp, Zp) for the subsequent commands.

$$Xp=Xc-Xw \quad (25)$$

$$Yp=Yc-Yw \quad (26)$$

$$Zp=Zc-Zw \quad (27)$$

Thus, precise machining is performed on the workpiece mounted on the turning table with the simple machining program by the above-described interpolation processing.

In the above example, the workpiece coordinate system is not considered with respect to A- and C-axes for simplification. The calculations may be performed by taking the workpiece coordinate system into consideration with respect to the A- and C-axes in the same manner as the X-, Y- and Z-axes.

In the above description, the workpiece coordinate system $\Sigma W$ is set to the table 1 at a start of the tool center point control, and commands of the machining program are executed in the workpiece coordinate system $\Sigma W$. Since the workpiece coordinate system $\Sigma W$ turns with the turn table 1, a relationship between a machining path of the tool center point P commanded by the machining program for determining a shape of the machining in the workpiece coordinate system $\Sigma W$ and an actual machining path on the workpiece 3 mounted on the table 1 is fixed. Thus, the machining shape on the workpiece defined in the workpiece coordinate system $\Sigma W$ is realized on the workpiece 3.

The commands of the machining program may be prepared as commands in a stationary workpiece coordinate system. Specifically, it is possible to prepare the commands of the machining program in the stationary workpiece coordinate system which does not turn with the table 1 and does not have influences from the turning of the table 1.

Figure 7:
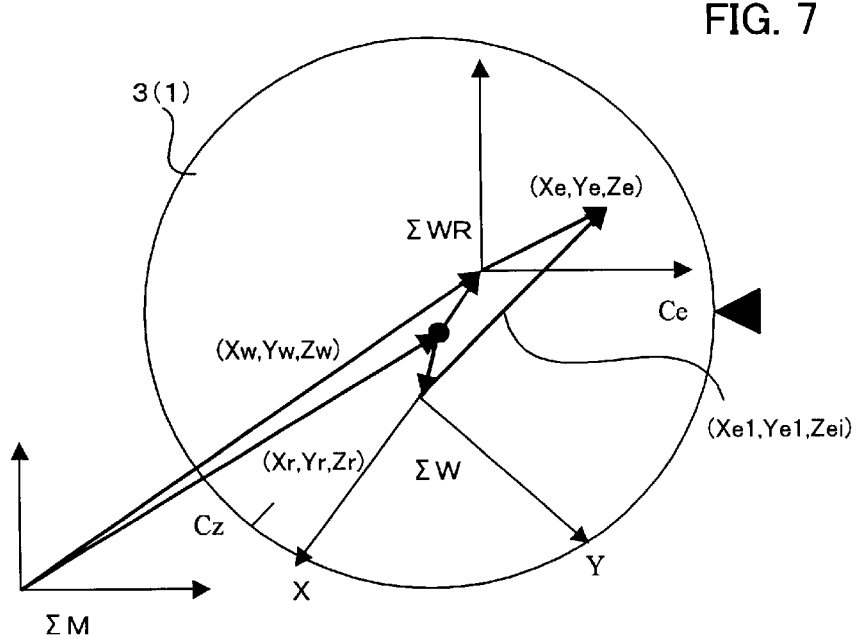
FIG. 7 is a schematic plan view showing another way of machining in the embodiment as shown in FIG. 6.

In this case, the processing of the calculation according to the equation (10) and the subsequent processing are performed using a position (Xe1, Ye1, Ze1) obtained by calculations according to the following equations (28)–(30) are used in place of the end position (Xe, Ye, Ze). Thus, the position (Xe1, Ye1, Ze1) of the tool center point Tp in the set workpiece coordinate system $\Sigma W$ turning with the turning table 1 is obtained based on the commanded position (Xe, Ye, Ze) in the stationary workpiece coordinate system $\Sigma WR$, as shown in FIG. 7, and the obtained coordinate position is regarded as the commanded position in the set workpiece coordinate system $\Sigma W$ and the processing of the calculation according to the equation (10) and the subsequent processing are performed.

$$Xe1=(Xw+Xe-Xr)^*\cos(Ce-Cz)-(Yw+Ye-Yr)^*\sin(Ce-Cz)-(Xw-Xr) \quad (28)$$

$$Ye1=(Xw+Xe-Xr)^*\sin(Ce-Cz)-(Yw+Ye-Yr)^*\cos(Ce-Cz)-(Yw-Yr) \quad (29)$$

$$Ze1=Ze \quad (30)$$

The orientation of the tool may be defined by an orientation vector (I, J, K). The interpolation of the angular positions of the rotational axes can be automatically performed based on the orientation vector by the numerical controller (CNC). In this case, the end position (Xe, Ye, Ze, Ae, Ce) of the block is replaced by (Xe, Ye, Ze, Ie, Je, Ke) using the orientation vector (Ie, Je, Ke) indicating an orientation of the tool in the workpiece coordinate system $\Sigma W$. The angular positions (Ae, Ce) of the rotational axes are calculated based on the orientation vector (Ie, Je, Ke) and the foregoing processing is performed using the calculated angular positions (Ae, Ce) of the rotational axes.

Figure 17:
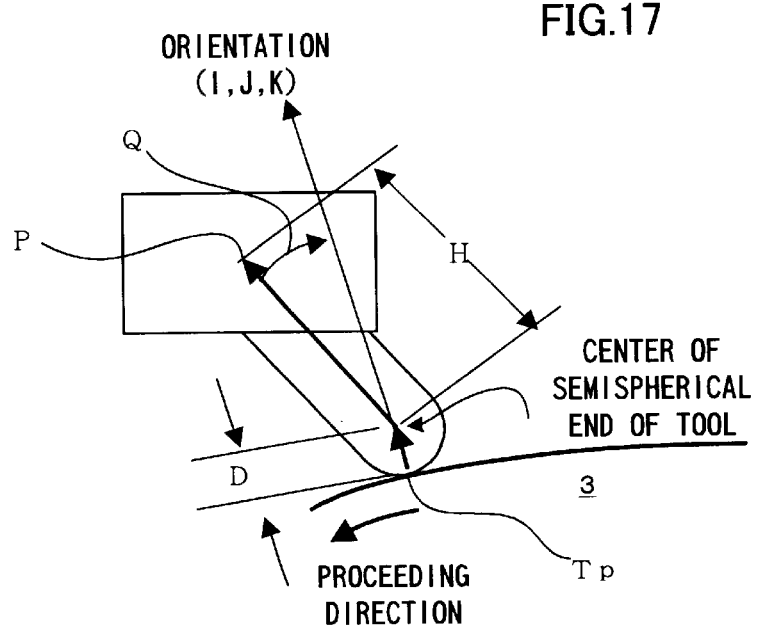
FIG. 17 is a schematic view showing an orientation vector and a shift amount in a case where the tool center point is set at a cutting point on an end surface of a ball-end mill.

Further, the orientation of the tool may be designated by the orientation vector (I, J, K) and a shift amount therefrom. In the case where the tool center point Tp is set at a cutting point on a semispherical end surface of a ball end mill tool, as shown in FIG. 17, an orientation tangent to perpendicular to a surface of the workpiece 3 is defined by the orientation vector (I, J, K) and the orientation of the tool is designated by a shift angel Q of a line tangent to a proceeding direction commanded by the program with respect to the orientation vector (L, J, K). In this case, the end position (Xe, Ye, Ze, Ae, Ce) of the block is replaced by (Xe, Ye, Ze, Ie, Je, Ke, Qe) using the orientation vector (Ie, Je, Ke) indicating the orientation perpendicular to the surface of the workpiece and the Qe indicating the shift angle of the line tangent to the proceeding direction commanded by the program. The angular positions (Ae, Ce) of the rotational axes are calculated based on the orientation vector (Ie, Je, Ke), the shift angle Qe and the proceeding direction commanded by the program, and a center of the semi-sphere of the end of the tool is obtained based on the orientation vector (Ie, Je, Ke) and a tool radius compensation amount D. The obtained center of the semi-sphere is used as the tool center point, and the foregoing processing is performed using the calculated angular positions (Ae, Ce) of the rotational axes.

The shift angle Q may be defined by Q1 indicating the shift angle of the line tangent to the proceeding direction commanded by the program and Q2 indicating a shift angle of the line perpendicular to the proceeding direction commanded by the program. In this case also, the angular positions (Ae, Ce) of the rotational axes are calculated, and a center of the semi-sphere of the end of the tool is obtained based on the orientation vector (Ie, Je, Ke) and the tool radius compensation amount D. The obtained center of the semi-sphere is used as the tool center point, and the foregoing processing is performed using the calculated angular positions (Ae, Ce) of the rotational axes.

Figure 18:
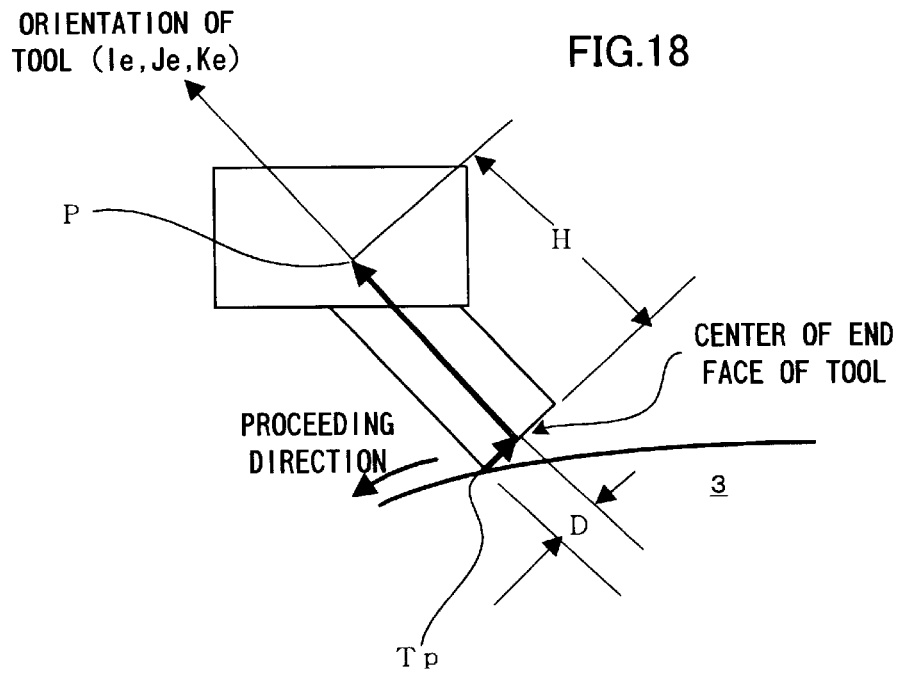
FIG. 18 is a schematic view showing an orientation vector and a shift amount in a case where the tool center point is set at a cutting point on an end face of a flat-end mill.

In the case where the tool center point Tp is set at a cutting point on an end face of a flat end mill tool, as shown in FIG. 18, the orientation of the tool is defined by an orientation vector (I, J, K) or positions of the rotational axes and a distance between the cutting point on the tip surface, and a distance between the cutting point on the end face and a center of the end face is defined by a tool radius compensation amount D. In the case of defining the orientation of the tool by the orientation vector (I, J, K), the end position is set to (Xe, Ye, Ze, Ie, Je, Ke) using the orientation vector (Ie, Je, Ke) indicating an orientation of the tool. The angular positions (Ae, Ce) of the rotational axes are calculated based on the orientation vector (Ie, Je, Ke), and the position of the center of the end face of the tool is obtained by shifting the tool center point Tp by the tool radius compensation amount D in the direction perpendicular to the orientation (Ie, Je, Ke) on a plane defined by a proceeding direction commanded by the program and the orientation (Ie, Je, Ke). The obtained center of the end face of the tool is used as the tool center point, and the foregoing processing is performed using the calculated angular positions (Ae, Ce) of the rotational axes.

Figure 8:
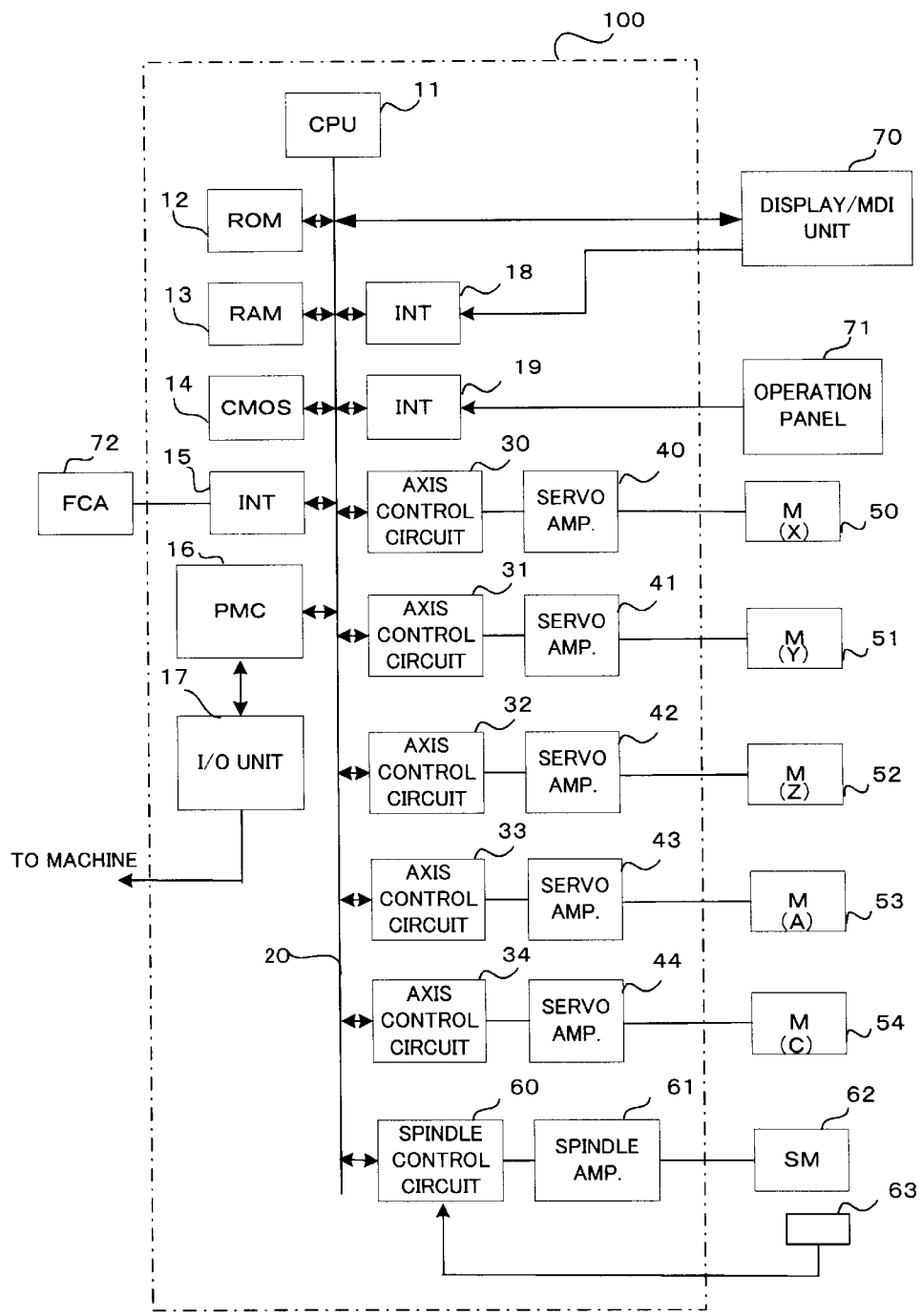
FIG. 8 is a block diagram of a numerical controller according to the present invention.

FIG. 8 shows a numerical controller (CNC) 100 for carrying out the tool center point control according to the present invention.

In FIG. 8, a CPU 11 reads a system program stored in a ROM 12 through a bus 20 and control the whole numerical controller 100 according to the system program. A RAM 13 stores temporary storage data for arithmetic operation, display data and various set data inputted through a display/MDI unit 70 by an operator. A CMOS memory 14 is backed up by a battery to function as a nonvolatile memory for retaining the stored data when a power supply is turned off. The CMOS memory 14 stores a machining program read through an interface 15 or the display/MDI unit 70. Various system programs for performing processing for creating/editing of the machining program in an editing mode and processing for an automatic operation of the machine are written in the ROM 12 in advance.

The machining programs for carrying out the tool center point control of the present invention may be stored in the CMOS memory 14 through the interface 15 or the display/MDI unit 70.

The interface 15 enables connection between the numerical controller 100 and an external device 72 such as an adapter. The machining programs and various parameters are read from the external device 72 through the interface 15. The machining program edited in the numerical controller 100 can be stored in a storage device through the external device 72. A PC (programmable controller) 16 outputs signals to a peripheral device of the machine, such as actuator of a robot hand for changing tools, through an I/O unit 17 in accordance with a sequential program. Also, the PC 16 receives signals from switches of an operation panel arranged on the machine tool and performs necessary processing on the signals to be transferred to the CPU 11.

The display/MDI unit 70 is a manual data input device having a display and a keyboard, and an interface 18 receives commands and data from the display/MDI unit 70 and transfers the received command and data to the CPU 11.

An interface 19 is connected to an operation panel 71 having a manual pulse generator.

Axis-control circuits 30–34 for respective axes output commands to servo amplifiers 40–44 for the respective axes in accordance with motion commands from the CPU 11. The servo amplifiers 40–44 drive respective servomotors 50–54 in accordance with the commands from the axis-control circuits 30–34. The servomotors 50–54 for respective axes have position/velocity detectors (not shown) and signals from the position/velocity detectors are fed back to the axis-control circuits 30–34 to perform feedback controls of position and velocity of the servomotors 50–54.

Figure 1:
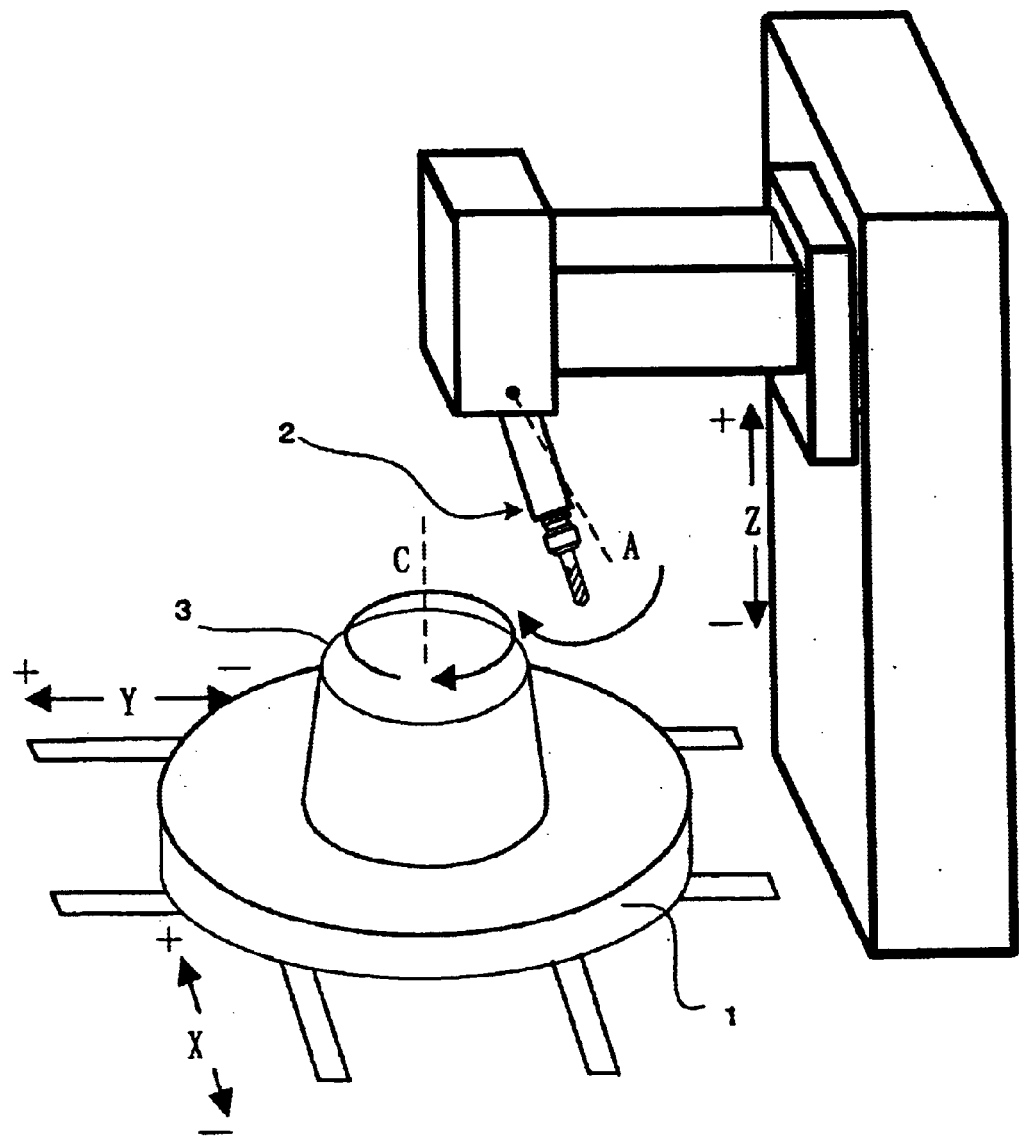
FIG. 1 is a schematic view of a five-axis machine tool having a rotational-motion axis for turning a table and a rotational-motion axis for tilting a tool head in addition to linear-motion axes.
Figure 2:
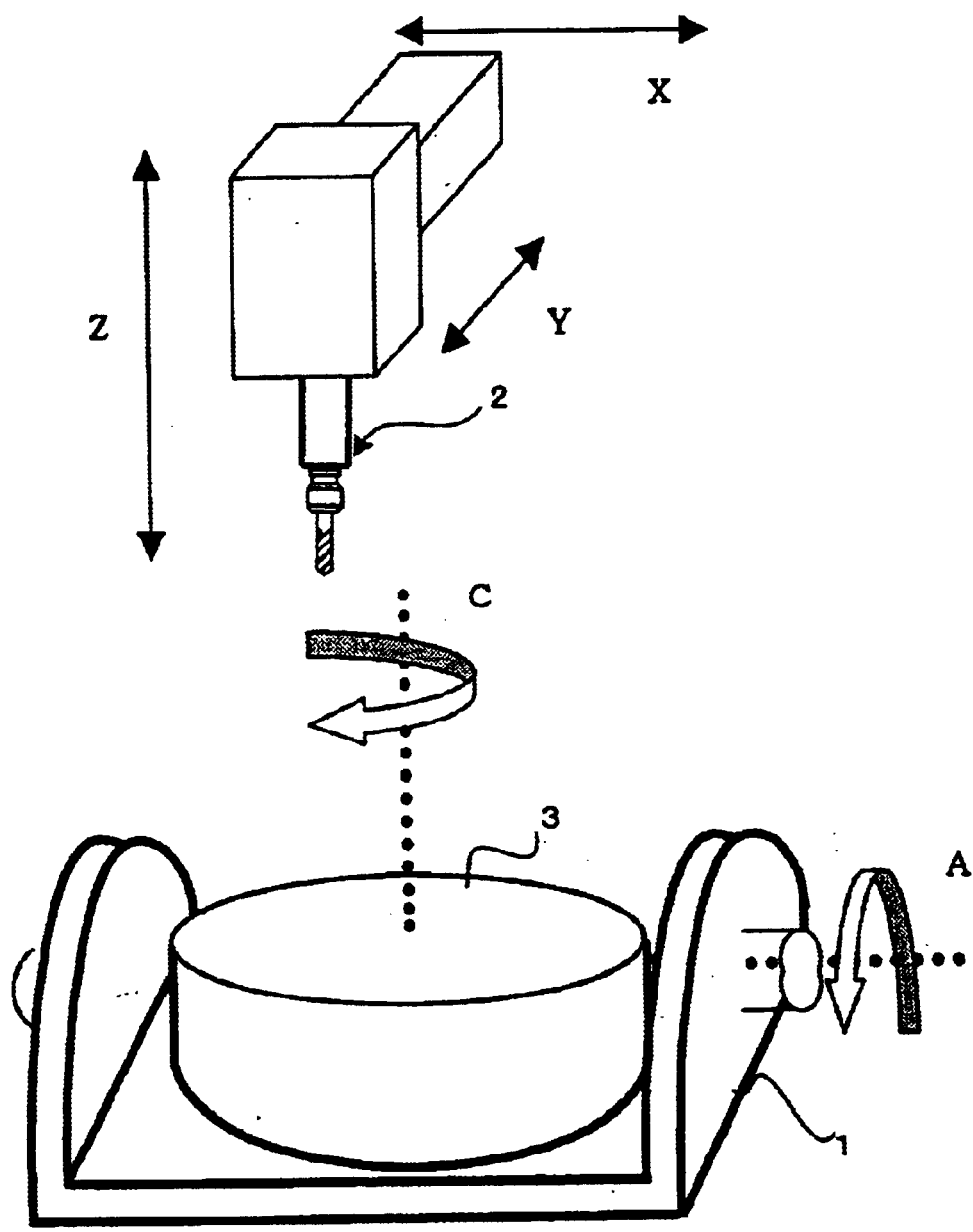
FIG. 2 is a schematic view of a five-axis machine tool having two rotational-motion axes for turning and tilting a table in addition to linear-motion axes.

The servomotors 50–54 respective drive the linear-motion axes of X, Y, Z and the rotational-motion axis of A and C of the five-axis machine tool as shown in FIGS. 1 and 2. A spindle-control circuit 60 receives a spindle rotation command and outputs a spindle velocity command to a spindle amplifier 61. The spindle amplifier 61 drives a spindle motor 62 at a speed commanded by the spindle velocity command from the spindle-control circuit 60. A position corder 63 outputs feedback pulses synchronized with rotation of the spindle motor 62 to the spindle-control circuit 60 for velocity control of the spindle motor 62.

With the above arrangements, the numerical controller 100 controls the five-axis machine tool as shown in FIGS. 1 and 2 to perform the tool center point control.

Hereinafter, examples of the tool center point control using the numerical controller for controlling the five-axis machine tool as shown in FIG. 1.

In the Case of the Workpiece Coordinate System ΣW Turning with the Table

First, the workpiece coordinate system ΣW is defined by setting a position (Xw, Yw, Zw) of an origin of the workpiece coordinate system in the machine coordinate system ΣM. Further, a position (Xr, Yr, Zr) of a center of turning of the turn table 1 (a workpiece 3) is set and stored as a parameter. In the following example, it is set that Xw=Xr and Yw=Yr, but coordinate values (Xw, Yw) and (Xr, Yr) are not necessarily equal to each other.

Commands in the machining program for the tool center point control for machining the workpiece 3 turning with the table 1 are prepared with respect to the workpiece coordinate system ΣW. Thus, the workpiece coordinate system ΣW is defined at the start of the tool center point control to be fixed to and turned with the table 1.

Figure 9:
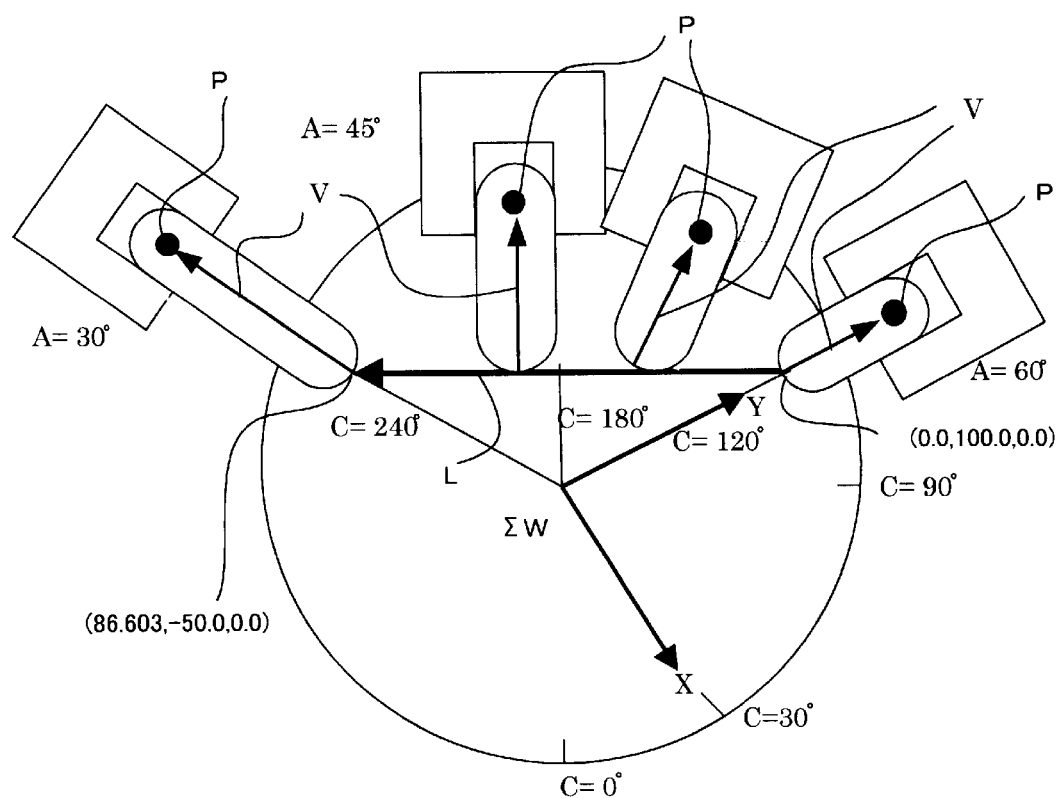
FIG. 9 is a schematic plan view showing a relationship of the table and the tool in a cutting operation along a straight line while turning the table and varying a tilting angle according to the present invention.

The following machining program is prepared and executed for machining the workpiece 3 turning with the table along a straight line L, as shown in FIG. 9.

EXAMPLE 1

In the Case of the Workpiece Coordinate System ΣW Turning with the Table

N100 G54 H01 C30.0;  (Definition of workpiece coordinate system and designation of tool length compensation number)
N101 G90 G00 X0.0 Y150.0 Z86.603 A60.0 C30.0; (Positioning of a start point)
N200 G43.4;                (Staff of tool center point control)
N301 G01 X-86.603 Y-50.0 Z0.0 A30.0 C150.0 F5000;
                           (Cuffing along straight line L)
N400 G49;                  (Termination of tool center point control)

In the block N100, the numerical controller 100 stores and set the position (Xw, Yw, Zw) of the origin of the workpiece coordinate system designated by the code G54 and a tool length compensation H for the tool length compensation number 01. In this example, a value of the tool length compensation number H01 is 100.0, and the origin of the workpiece coordinate system and the center of turning of the table 1 are set as (Xw, Yw, Zw)=(Xr, Yr, Zr)=(200.0, 200.0, 100.0).

In the statement of N101, the code "G90" designates an absolute command, the code. "G00" designates positioning, and the position of the controlled point P in the workpiece coordinate system ΣW is designated as X=0.0, Y=150.0, Z=86.603, A=60.0, C=30.0.

The position of the controlled point P in the workpiece coordinate system ΣW is converted into a position (Xm, Ym, Zm, Am, Cm) in the machine coordinate system ΣM, as follows;

$$Xm = 0.0 + 200.0 = 200.0 \tag{31}$$

$$Ym = 150.0 + 200.0 \tag{32}$$
$$= 350.0$$

$$Zm = 86.603 + 100.0 = 186.603 \tag{33}$$

$$Am = 60.0 \tag{34}$$

$$Cm = 30.0 \tag{35}$$

Figure 10A:
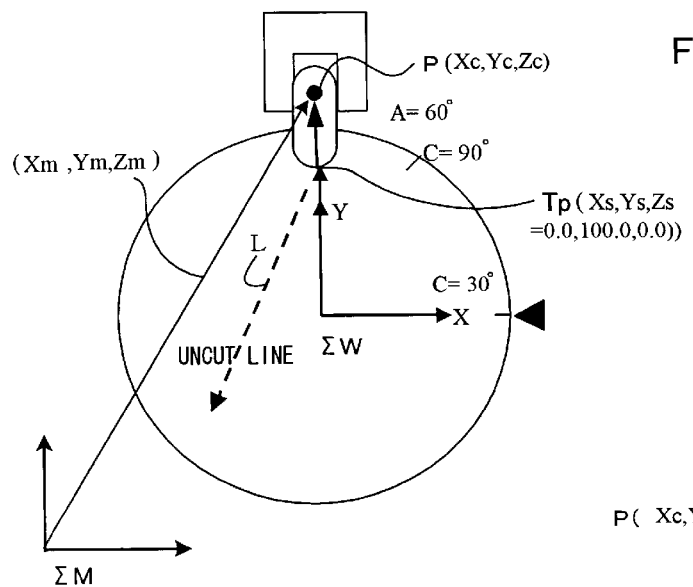
FIGS. 10a–10c are schematic plan views showing relative positions of the table and the tool head in the cutting operation according to the present invention as shown in FIG. 9.

The respective axes of the machine tool are moved to the above positions by the command in the block N101, as shown in FIG. 10a.

The code "G43.4" is a command for starting the control of the tool center point Tp and thereinafter a path of motion of the tool center point Tp is designated by the program to the end of the control. The machining start position (Xs, Ys, Zs) of the tool center point Tp is obtained based on the present position of the controlled point P, the orientation (Am, Cm) of the tool and the tool length compensation amount H. In the case where the present position of the controlled point P is (200.0, 350.0, 186.603), the orientation of the tool is (A 60.0, C 30.0) and the tool length correction amount H=100.0, the position (Xs, Ys, Zs)=(200.0, 350.0, 186.603) of the tool center point Tp is obtained according to the above-mentioned equations (1)–(3), as follows;

$$Xs = Xm - Xw \tag{36}$$
$$= 200.0 - 200.0 = 0.0$$

$$Ys = Ym - H*\cos(60.0) - 200.0 \tag{37}$$
$$= 350.0 - 100.0*\cos(60.0) - 200.0$$
$$= 100.0$$

$$Zs = Zm - H*\sin(Am) - Zm \tag{38}$$
$$= 186.603 - 100.0*\sin(60.0) - 100.0$$
$$= 0.0$$

The above coordinate values are also set as (Xj, Yj, Zj) and the position (Xm, Ym, Zm, Am, Cm) of the controlled point P in the machine coordinate system is set as (Xo, Yo, Zo, Ao, Co). Further, the angular position (30.0) of the C-axis is set as Cz.

This state is shown in FIG. 10a where the tool 2 is positioned at a start position of the machining along a straight line L.

In the block of N301, the code "G01" represents a command for cutting feed to command to feed the tool center point Tp moves to (−86.603, −50.0, 0.0), the orientation of the tool to a target value (A=60.0, C=30.0) at the velocity of 5000 mm/min.

Interpolation is performed from the position (Xs, Ys, Zs)=(0.0, 100.0, 0.0) of the tool center point Tp at the start of machining to the commanded end position (Xe, Ye, Ze)=(−86.603, −50.0, 0.0) with respect to the X-, Y- and Z-axes, to obtain interpolation points (Xi, Yi, Zi). Namely, the interpolation points (Xi, Yi, Zi) are obtained according to the equations (10)–(14). Assuming that the interpolation period Δt=1 msec, $$K1 = 1 \text{ msec} * 5000 \text{ mm/min} = 0.083 \text{ mm} \tag{39}$$

$$D = \sqrt{((-86.603-0.0)^2 + (-50.0-100.0)^2 + (0.0-0.0)^2)} \tag{40}$$
$$= 173.205$$

$$Xi = 0.083*(86.603/173.205) + Xj = 0.042 + Xj \tag{41}$$

$$Yi = 0.083*(150.0/173.205) + Yj = 0.072 + Yj \tag{42}$$

$$Zi = 0.0 \tag{43}$$

With respect to the A- and C-axes, interpolation is performed from the present position (A=60.0, C=30.0) to the commanded position (A=30.0, C=150.0) to obtain the interpolation points (Ai, Ci). The position of the interpolation points are set at the same rate of the motion of the tool center point Tp from the start point (Xs, Ys, Zs)=(0.0, 100.0, 0.0) to the end point (Xe, Ye, Ze)=(−86.603, −50.0, 0.0). Thus, Ai and Ci are obtained according to the equations (16) and (17), as follows;

$$Ai=K2*(30.0-60.0) \tag{45}$$

$$Ci=K2*(150.0-30.0) \tag{46}$$

where $$K2=[\sqrt{((Xi-0.0)^2+(Yi-100.0)^2+(Zi-0.0)^2)}]/[\sqrt{((-86.603-0.0)^2+(-50.0-100.0)^2+(0.0-0.0)^2)}] \tag{44}$$

Figure 10B:
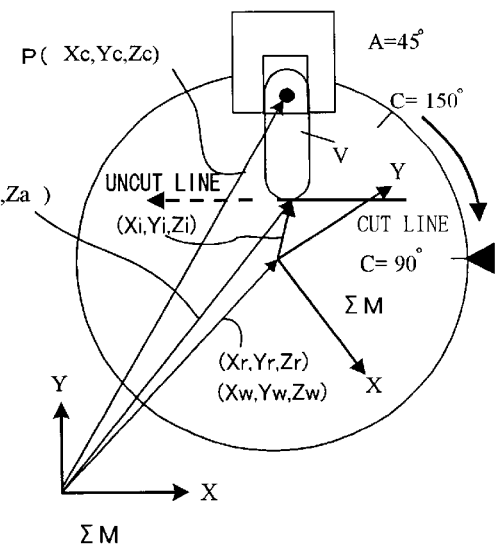

For example, when the interpolation point (Xi, Yi, Zi) is (−43.302, 25.0, 0.0), Ai=45.0 and Ci=90.0, as shown in FIG. 10b.

The position of the interpolation point (Xa, Ya, Za) for the motion of the tool center point Tp in the machine coordinate system ΣM is obtained according to the equations (18)–(20). For example, as shown in FIG. 10b, when the interpolated position of the C-axis Ci=90.0, the position of the interpolation point (Xi, Yi, Zi) in the X-, Y-, Z-axes is (−43.302, 25.0, 0.0) and the interpolated position (Xa, Ya, Za)=(175.0, 243.302, 100.0) of the tool center point Tp in the machine coordinate system ΣM is obtained according to the equations (18)–(20), as follows;

$$Xa = (-43.302)*\cos(-90.0+30.0) - 25.0*\sin \tag{47}$$
$$(-90.0+30.0)+200.0$$
$$= 200.0$$

$$Ya = (-43.302)*\sin(-90.0+30.0) + 25.0*\cos \tag{48}$$
$$(-90.0+30.0)+200.0$$
$$= 250.0$$

$$Za = 0.0 + 100.0 \tag{49}$$
$$= 100.0$$

Also, the tool length compensation vector V is obtained based on the interpolated position Ai of the A-axis. When Ai=45.0, the tool length correction vector V=(0.0, 70.711, 70.711) according to the equation (21)–(22).

$$Vx=0.0 \quad (50)$$

$$Vy=100*\cos(45.0)=70.711 \quad (51)$$

$$Vz=100*\sin(45.0)=70.711 \quad (52)$$

The position (Xc, Yc, Zc) of the controlled position P is obtained by adding the tool length correcting vector V to the interpolated position (Xa, Ya, Za) of the tool center point Tp in the machine coordinate system ΣM, according to the equation (24).

$$Xc=200.0+0.0=200.0 \quad (53)$$

$$Yc=250.0+70.711=320.711 \quad (54)$$

$$Zc=100.0+70.711=170.711 \quad (55)$$

A difference between the position (Xc, Yc, Zc) of the controlled position Tp in the present interpolation period and the position (Xo, Yo, Zo) of the controlled position Tp in the preceding interpolation period is outputted to the axis control circuits 30–32 as a motion amount for the linear axes of X, Y and Z. Simultaneously, the interpolated positions (Ao, Co) of the A-, C-axes in the present interpolation processing period and the interpolated positions (Ai, Ci)=(Ac, Cc) for the turning-motion axes A and C in the preceding interpolation processing period is outputted to axis-control circuits 33 and 34 for the A- and C-axes as the motion amount in the present interpolation processing period. Further, the position (Xo, Yo, Zo) of the controlled point P in the preceding interpolation period is replaced by the position (Xc, Yc, Zc) in the present interpolation period and also the orientation (Ao, Co) of the tool is replaced by (Ac, Cc).

Figure 10C:
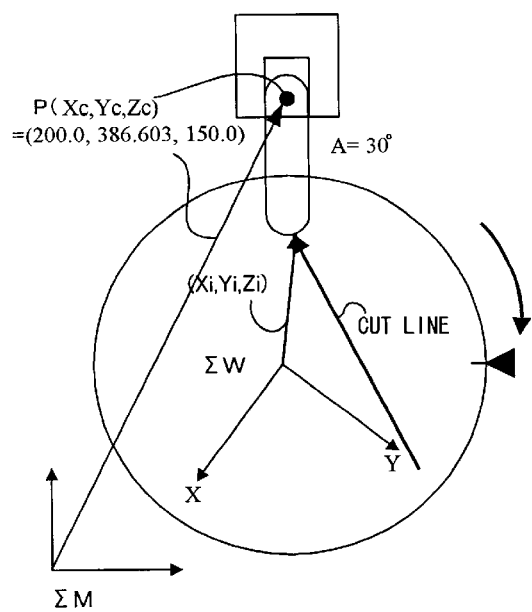

As described, the tool center point Tp is moved to the target position commanded by the block N301 while performing the interpolation processing to successively shifting the position of the tool center point Tp by driving the X-, Y-, Z-, A- and C-axes to the interpolated positions. FIG. 10c shows a state where the tool center point Tp reaches to the machining end point.

The code "G49" in the block N400 is a command of terminating the control of the motion of the tool center point. The final interpolation point (Xc, Yc, Zc) of the controlled point P is transformed into the position in the workpiece coordinate system according to the equations (25)–(27), and transformed position in the workpiece coordinate system are regarded as the programmed command (Xp, Yp, Zp).

$$Xp = Xc - Xw \quad (56)$$
$$= 200.0 - 200.0 = 0.0$$

$$Yp = Yc - Yw \quad (57)$$
$$= 386.603 - 200.0 = 186.603$$

$$Zp = Zc - Zw \quad (58)$$
$$= 150.0 - 100.0 = 50.0$$

Figure 3:
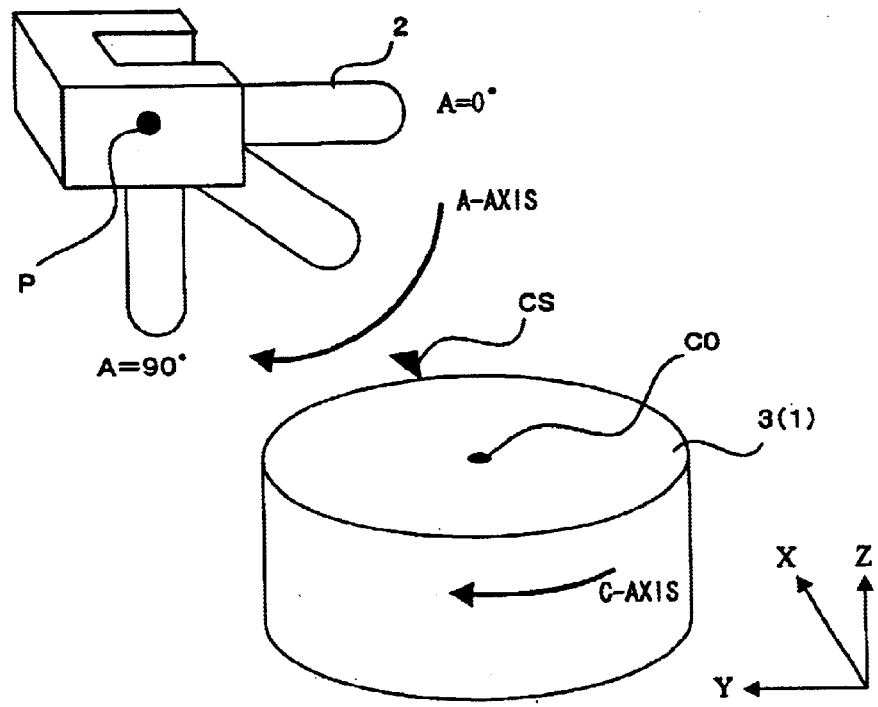
FIG. 3 is a schematic view showing a relationship of an A-axis for tilting the tool head and a C-axis for tuning the table.
Figure 4:
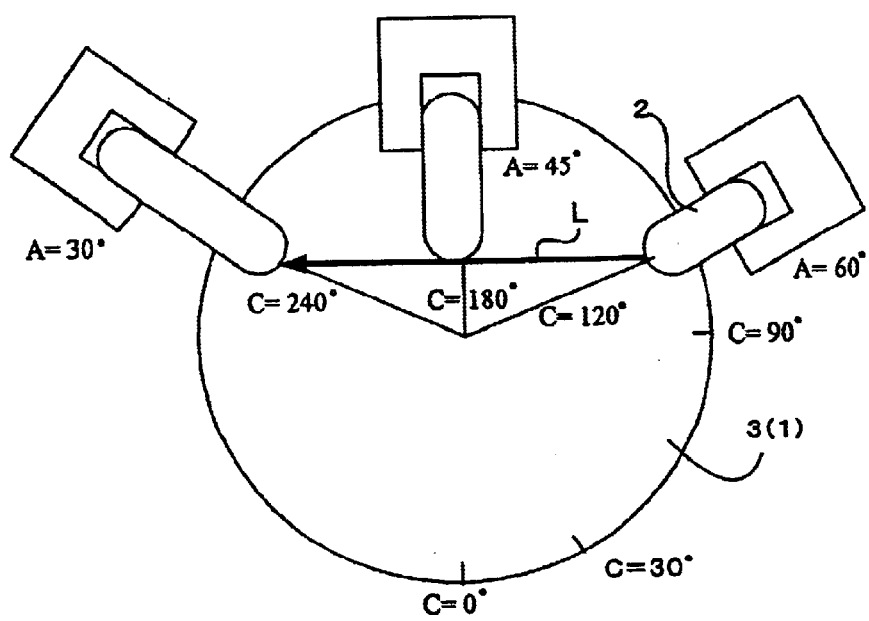
FIG. 4 is a schematic plan view showing a relationship of the table and the tool head in a cutting operation along a straight line while turning the table and varying a tilting angle according to the prior art.
Figure 5A:
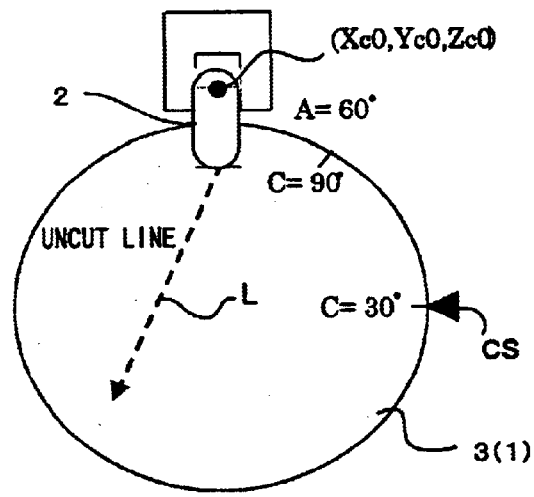
FIGS. 5a–5c are schematic plan views showing relative positions of the table and the tool head in the cutting operation according to the prior art as shown in FIG. 4.
Figure 5B:
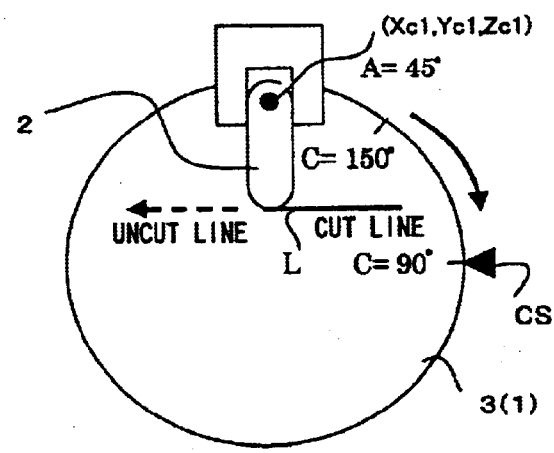
Figure 5C:
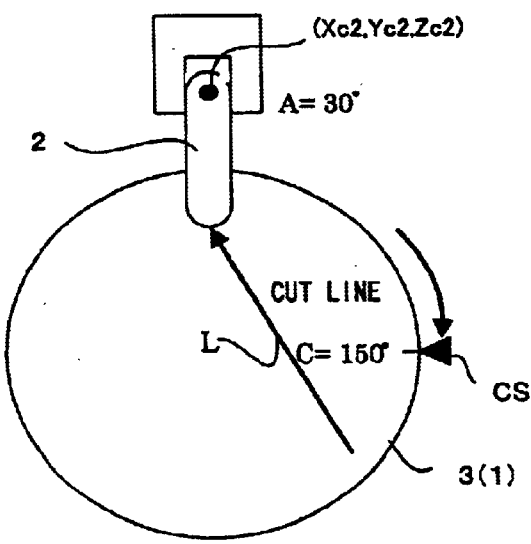

Thus, the cutting along the straight line L is completed as shown FIG. 10c. In the example of the conventional machining program for cutting along the straight line L as described referring to FIGS. 3–5, it is described that the cutting is performed by the commands of the two blocks of "N301" and "N302" for the sake of simplification, however it is hardly possible to perform the machining of high precision with only two blocks and it is actually required to prepare a large number of blocks. According to the present invention, the machining is commanded by only one block of "N301", to simplify the machining program.

In the above described example, the orientation of the tool is defied by the angular position of A-axis representing angle of tilting the tool and the angular position of the C-axis representing the angle of turning of the table 1. The orientation of the tool may be defined by the orientation vector V, as described, and the numerical controller may automatically calculate the interpolation of the rotational-motion axes.

In this case, the designated values of A=30.0 and C=150.0 in the block "N301" of the above program corresponds to an orientation of X=10.866, Y=–0.5, Z=0.577 in the workpiece coordinate system ΣW. Therefore, A 30.0 and C 150.0 are replaced by "I–0.866 J–0.5 K 0.577", and based on these values the numerical controller may calculate the values of A=30.0 and C=150.0.

In the Case of the Stationary Workpiece Coordinate System ΣWR

The case where commands in the machining program are prepared with respect to the stationary workpiece coordinate system ΣWR which does not rotate with the table and does not have influence from the turning of the table. The following machining program is prepared for performing the machining along a straight line L as performed by the Example 1.

EXAMPLE 2

In the Case of the Stationary Workpiece Coordinate System ΣWR

N100 G54 H01 C30.0;  (Selection of workpiece coordinate system, Designation of tool length compensation number)
N101 G90 G00 X0.0 Y150.0 Z86.603 A60.0 C30.0;
                              (Positioning of start point)
N200 G43.4;                  (Start of tool center point control)
N301 G01 X0.0 Y100.0 Z0.0 A30.0 C150.0 F5000;
                              (Cutting along straight line L)
N400 G49;                    (Termination of tool center point control)

This example differs from the Example 1 in that the block "N301" describes "G01 X0.0 Y100.0 Z0.0 A30.0 C150.0 F5000", whereas the block "N301" of the example-1 describes "G01 X-86.603 Y-50.0 Z0.0 A30.0 C150.0 F5000".

Since the commands in the block "N301" in this example are prepared as commands of the position of the tool center point Tp in the stationary workpiece coordinate system ΣWR, the processing same as that in the Example-1 can be performed by transforming the position of the tool center point Tp into the position in the workpiece coordinate system ΣW turning with the table.

Specifically, the position (Xe1, Ye1, Ze1) in the workpiece coordinate system ΣM is obtained based on the coordinate values (Xe, Ye, Ze) of the target position designated by this block according to the equations (28)–(30), and the obtained coordinate values (Xe1, Ye1, Ze1) are used in place of (Xe, Ye, Ze).

$$Xe1 = (Xw + Xe - Xr) * \cos(Ce - Cz) - \\ (Yw + Ye - Yr) * \sin(Ce - Cz) - (Xw - Xr) \\ = 0.0 * \cos(120.0) - 100.0 * \sin(120.0) \\ = -86.603 \quad (59)$$

$$Ye1 = (Xw + Xe - Xr) * \sin(Ce - Cz) + \\ (Yw + Ye - Yr) * \cos(Ce - Cz) - (Yw - Yr) \\ = 0.0 * \sin(120.0) + 100.0 * \cos(120.0) \\ = 50.0 \quad (60)$$

$$Ze1 = Ze = 0.0 \quad (61)$$

As described, the position designated by the transformed coordinate position (Xe1, Ye1, Ze1)=(−86.603, 50.0, 0.0) are identical to the coordinate position "X=−86.608, Y=−50.0, Z=0.0" of the command in the block N301 in the Example 1. The subsequent processing is the same as the processing in the Example-1.

Figure 11:
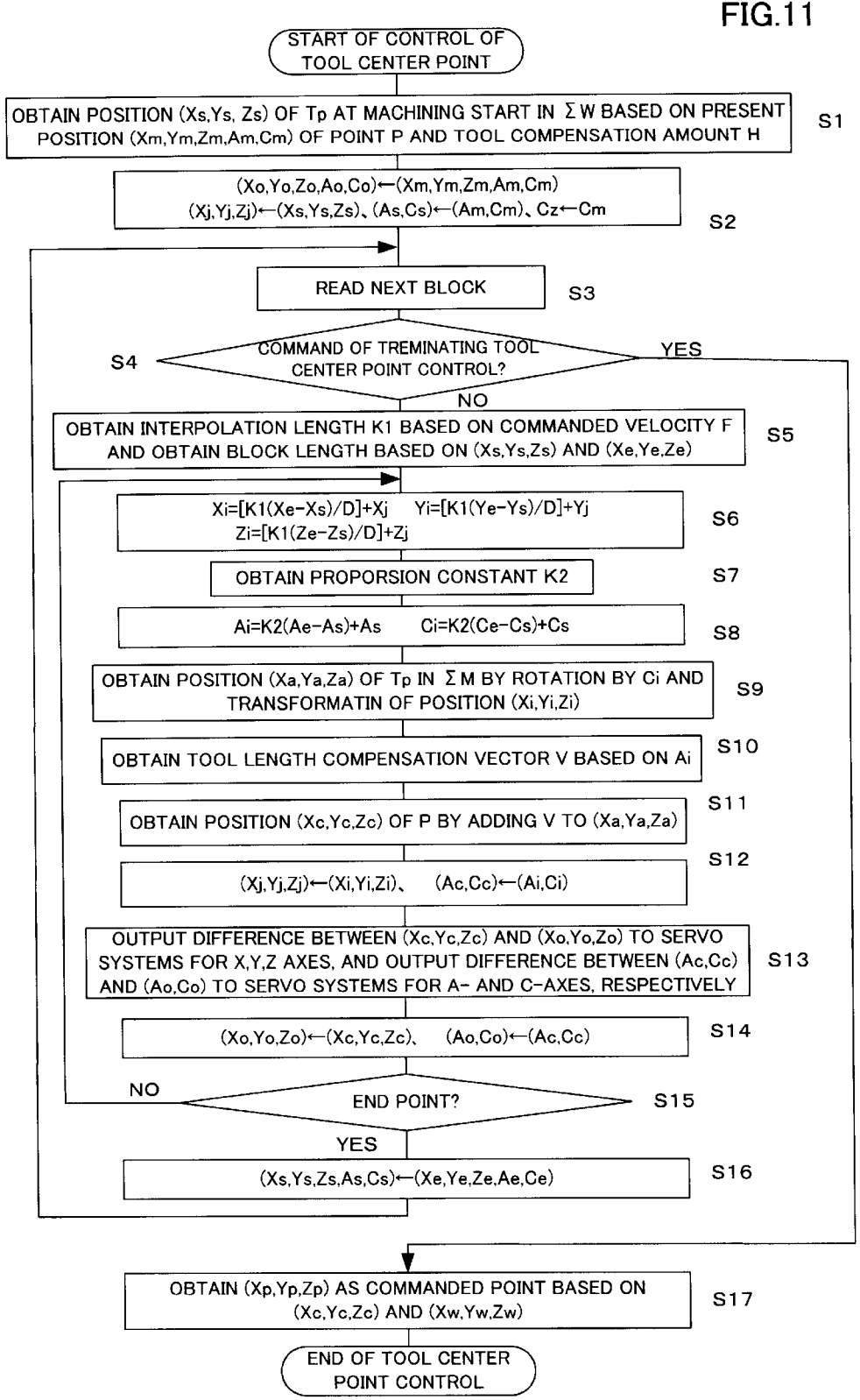
FIG. 11 is a flowchart of processing of a tool center point control.

FIG. 11 shows a flowchart of processing for the tool center point control to be executed by the processor 11 of the numerical controller 100.

The processor 11 starts the processing as shown in FIG. 11 when a command "G43.4" for starting the tool center point control in the machining program. The workpiece coordinate system ΣM (Xw, Yw, Zw) and the tool length compensation amount H are set and stored as shown in Example-i and Example-2 before the command "G43.4" for starting the tool center point control is read. Also, the tool center point P has been positioned to a machining start position of the tool center point control.

When the command "G43.4" for starting the tool center point control is read, the position (Xs, Ys, Zs) of the tool center point Tp for the start of machining in the workpiece coordinate system ΣW is obtained based on the present position (Xm, Ym, Zm) of the controlled point P, the angular position Am of A-axis, the angular position of the C-axis and the tool length compensation amount H by executing the arithmetic operation according to the equation (Step S1).

The position (Xm, Ym, Zm) is stored as the position (Xo, Yo, Ao, Co) at the immediately preceding interpolating processing period, and the position (Xs, Ys, Zs) of the tool center point Tp is stored as the immediately preceding interpolated position (Xj, Yj, Zj). Further, (Am, Cm) is stored as (As, Cs) and Cm is stored as Cs (Step (S2).

Then, the next block is read (Step S3) and it is determined whether or not the read block is a command (G49) of terminating the tool center point control (Step S4). The cutting feed command (G 01) next to the command (G43.4) for starting the tool center point control is read and the procedure proceeds to Step S5. In Step S5, the length K1 by which the tool center point Tp is to move for the interpolation period and the machining length D commanded by the block by performing the arithmetic operation according to the equations (10) and (11), based on the commanded position (Xe, Ye, Ze) and the present position (Xs, Ys, Zs) of the tool center point Tp and the commanded velocity F.

The interpolated position (Xi, Yi, Zi) is obtained by performing the arithmetic operation according to the equations (12)–(14) using the obtained K1 and D, the commanded position (Xe, Ye, Ze) and the preceding position (Xj, Yj, Zj) (Step S6). The proportional coefficient K2 is obtained according to the equation (15) (Step S7) and the interpolated positions Ai and Ci of the A-axis and the C-axis, respectively are obtained according to the equations (16) and (17) (Step S8).

The interpolated position (Xi, Yi, Zi) is rotated to obtain the position (Xa, Ya, Za) of the tool center point Tp in the machine coordinate system ΣM by performing the arithmetic operation according to equations (18)–(20) using the obtained turning angle Ci of the table 1 (Step S9).

Further, the tool length compensation vector V(Vx, Vy, Vz) is obtained by performing the arithmetic operation according to the equations (21)–(23) using the angular position Ai which is the tilting angle of the A-axis (Step S10). Then, the tool length compensation vector V(Vx, Vy, Vz) is added to the position (Xa, Ya, Za) of the tool center point Tp in the machine coordinate system ΣM according to the equation (24), to obtain the position (Xc, Yc, Zc) of the controlled point P in the machine coordinate system ΣM (Step S11).

The coordinate data (Xi, Yi, Zi) are stored as (Xj, Y, Zj) and the coordinate data (Ai, Ci) are stored as (Ac, Cc) (Step S12) for the next interpolating processing. The present position (Xo, Yo, Zo) of the controlled position P is subtracted from the position (Xc, Yc, Zc) of the controlled position P obtained by the interpolation and the obtained difference is outputted to the servo system as the command for the servomotors 50, 51 and 52 of X-, Y- and Z-axes. The present position Ao and Co are subtracted from the interpolated position Ac and Cc, respectively, and obtained differences are outputted to the servo system for the servo motors 53 and 54 of the A-axis and the C-axis (Step S13).

The position (Xc, Yc, Zc) of the controlled point P, and the interpolated positions of the A- and C-axes are stored as the present position (Xo, Yo, Zo), and the present positions Ao, Co, respectively (Step S14). Then, it is determined whether or not the tool center point Tp reaches the end of the block (Step S15). If the tool center point Tp does not reach the end of the block, the procedure returns to Step S6.

Subsequently, the processing of Steps S6–S16 is repeatedly executed until the tool center point Tp reaches the end of the block to perform the interpolation to the commanded position to drivingly control the respective axes. When it is determined that the tool center point Tp reaches the end of the block at Step S15, the end position (Xe, Ye, Ze, Ae, Ce) is stored as the start position of the next block (Step S16) and the procedure returns to Step S3. The processing of Step S3 and the subsequent steps is repeatedly executed unless the command of terminating the tool center point control is read to continue the machining. When the command of terminating the tool center point control is read, the procedure proceeds from Step S4 to Step 17 where the coordinate position (Xp, Yp, Zp) is calculated according to the equations (25)–(27) to be used as the program command, to terminate the tool center point control.

In the case where command in the program for the tool center point control are prepared in the stationary workpiece coordinate system ΣMR not turning with the table 1, the commanded position (Xe, Ye, Ze) is transformed to the position (Xe1, Ye1, Ze1) in the workpiece coordinate system ΣM turning with the table according to the equations (28)–(30), and the processing as shown in FIG. 11 is executed using the transformed position (Xe1, Ye1, Ze1) in place of the commanded position (Xe, Ye, Ze).

In the case of obtaining the tool length compensation vector V in advance to perform the compensation, the processing of Step S1 is modified. In this case, the present position (Xm, Ym, Zm) of the controlled position P in the machine coordinate system ΣM, the present position (Am, Cm) of the A- and C-axes are read, and the tool length compensation vector V is obtained according to the equations (4)–(6) using the present position of the A- and C-axes and the tool length compensation amount H, and the axes of X, Y, Z proceed by the tool length compensation vector V and the positions of the X-, Y-, Z-axes are read. The position (Xs, Ys, Zs) of the tool center point Tp in the workpiece coordinate system $\Sigma W$ at the start of machining is obtained according to the equations (7)–(9) using the read position as the present position (Xm, Ym, Zm) of the controlled point P.

In the foregoing embodiment, the present invention is applied to a machine tool having one axis (C-axis) for turning the table and one axis (A-axis) for tilting the tool head, the present invention is applicable to a machine tool having two axes for turning and tilting the table or another axis other than the A-axis and the C-axis. Also, the present invention is applicable to a machine tool having the C-axis for turning the table but not having the A-axis for tiling the tool head. In this case, all the command values and the present value of the A-axis are set to "0" or to be constant.

Further, according to the present invention, the five-axis machining can be realized in a lathe. For example, the present invention is applicable to a lathe having a C-axis for turning a workpiece 3 and a B-axis for tilting a tool 2, as shown in FIG. 19.

Figure 19:
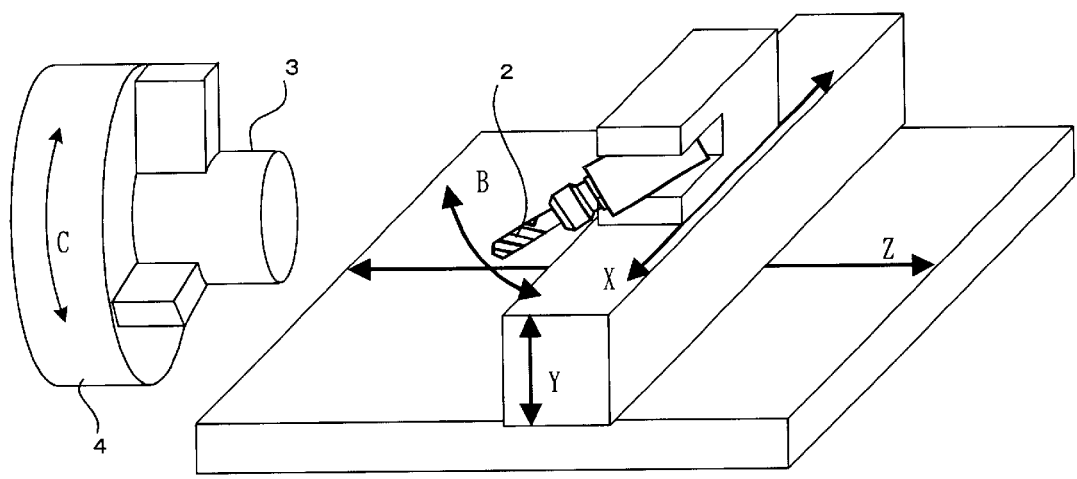
FIG. 19 is a schematic view of a five-axis machine tool as a lathe to which the present invention is applicable.

In the lathe shown in FIG. 19, the workpiece 3 is fixed to a workpiece holding stock 4 by a jig, and the tool 2 is arranged to be movable in the directions of the rectangular axes of X, Y, Z and also arranged to tilt or swivel along the B-axis parallel to the Y-axis. The machine tool of the lathe shown in FIG. 19 differs from the machine tool shown in FIG. 1 only in that the B-axis for tilting the tool 2 is used in place of the A-axis for tilting the tool head. Thus, the present invention is applicable to the lathe by substituting the B-axis for the A-axis.

The tool center point Tp representing a position of the tool is set at a tip of the tool in the foregoing embodiments. The tool center point Tp may be set at various points with respect to the tool as shown in FIGS. 12–16.

Figure 12:
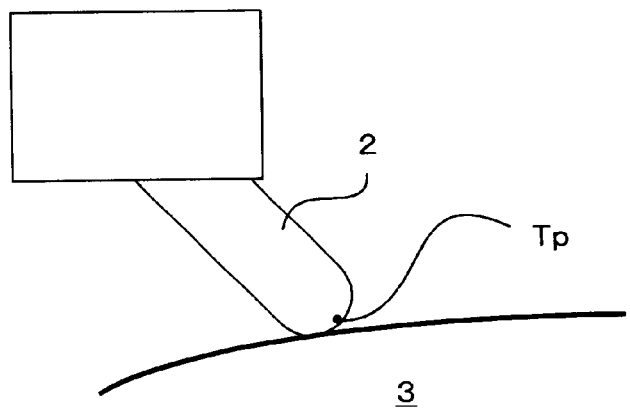
FIG. 12 is a schematic view showing a tool center point set at a tip of the tool.
Figure 13:
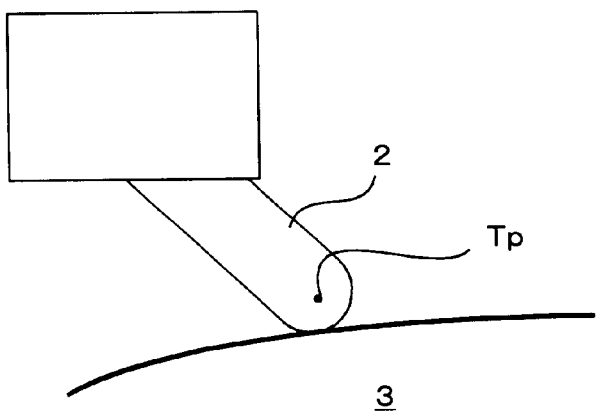
FIG. 13 is a schematic view showing a tool center point set at a center of a semispherical end surface of a ball-end mill.
Figure 14:
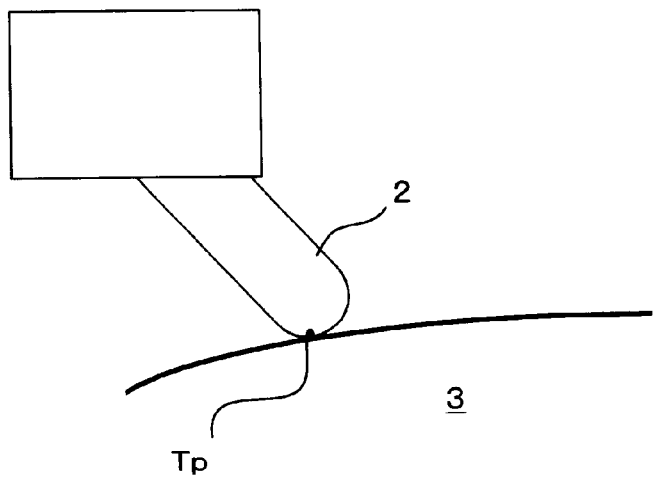
FIG. 14 is a schematic view showing a tool center point set at a cutting point on the semispherical end surface of the ball-end mill.
Figure 15:
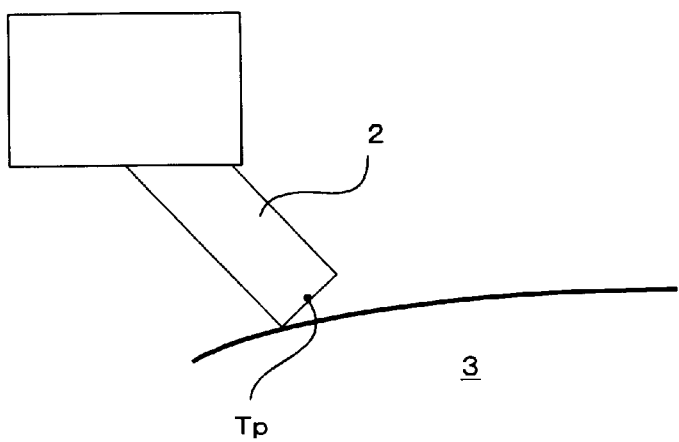
FIG. 15 is a schematic view showing a tool center point set at a center of an end face of a flat-end mill.
Figure 16:
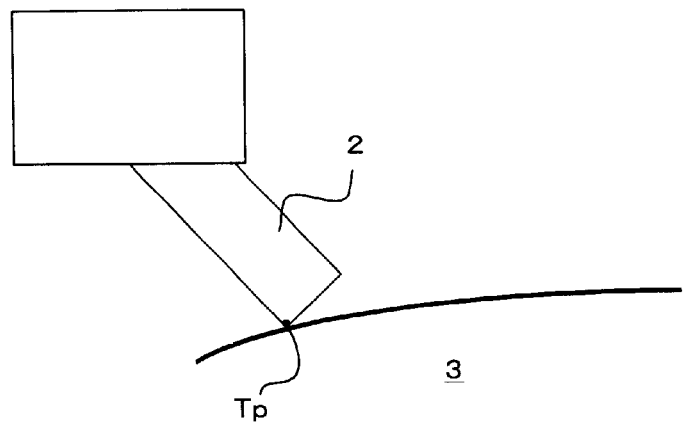
FIG. 16 is a schematic view showing a tool center point set at a cutting point of the end face of the flat-end mill.

FIG. 12 shows a case where the tool center point Tp is set at a tip of the tool 2. FIG. 13 shows a case where the tool center point Tp is set at a center of a semispherical end surface of a ball-end mill tool. FIG. 14 shows a case where the tool center point Tp is set at a cutting point on the semispherical end surface of the ball-end mill tool. FIG. 15 shows a case where the tool center point Tp is set at a center of an end face of a flat-end mill tool. FIG. 16 shows a case where the tool center point Tp is set at a cutting point on the end face of the flat-end mill tool.

According to the present invention, in a machine tool having a rotational-motion axis for turning a table on which a workpiece is mounted and a rotational-motion axis for tilting a tool head or the table in addition to a plurality of linear motion axes, machining along a predetermined path at a predetermined velocity is realized with a simple machining program while driving the rotational-motion axes. Further, it is not necessary to create new machining programs by the CAM for various lengths of tools, to reduce a cycle time of machining.

What is claimed is:

1. A numerical controller for controlling a machine tool having a plurality of linear-motion axes and at least one rotational-motion axis for a table on which a workpiece is mounted, said controller comprising:

motion commanding means for providing a command of motion path for said linear-motion axes, a command of velocity of said tool with respect to said workpiece, and a command of rotational motion of the rotational-motion axis for defining an orientation of said tool with respect to said table;

coordinate system defining means for defining a coordinate system with respect to said table;

first interpolation means for performing interpolation on the commanded motion path using the commanded velocity in said coordinate system to obtain interpolated position data for said linear-motion axes;

second interpolation means for interpolating the rotational motion of said rotational-motion axis based on the commanded motion path and the commanded velocity to obtain interpolated position data for the rotational-motion axis; and correction means for correcting the interpolated position data obtained by said first interpolation means based on the interpolated position data for the rotational-motion axis, wherein motion commands for the linear-motion axes are outputted based on the interpolated position data for the linear-motion axes corrected by said correction means, and motion commands for the rotational-motion axis are outputted based on the interpolated position data for the rotational-motion axis so that a tool center point set to the tool is moved along the commanded motion path at the commanded velocity.

2. A numerical controller according to claim 1, wherein said machine tool has an axis for tilting said tool with respect to said table as the rotational-motion axis.

3. A numerical controller according to claim 1, wherein said machine tool has an axis for tilting said table with respect to said tool as the rotational-motion axis.

4. A numerical controller according to claim 1, wherein said correction means corrects the interpolated position data for the linear-motion axis using a predetermined tool length compensation amount and/or a predetermined tool radius compensation amount.

5. A numerical controller according to claim 1, wherein said orientation of tool is provided as a command for rotational position of said rotational-motion axis.

6. A numerical controller according to claim 1, wherein said orientation of tool is provided as an orientation vector.

7. A numerical controller according to claim 1, wherein said coordinate system defining means defines a coordinate system which turns with said table, and said motion commanding means provides the command for motion path of said linear-motion axis in the coordinate system which turns with said table.

8. A numerical controller according to claim 1, wherein said motion commanding means provides the command of motion path for said linear-motion axes by transforming a command of motion path for said linear-motion axes commanded in a coordinate system which does not turn with said table into a command of motion path in a coordinate system which turns with said table.

9. A numerical controller according to claim 1, wherein the tool center point is set at a tip of the tool.

10. A numerical controller according to claim 1, wherein the tool center point is set at a center of a semispherical end surface of a ball end mill tool or a cutting point on the semispherical end surface of the ball end mill tool.

11. A numerical controller according to claim 1, wherein the tool center point is set at a center of an end face of a flat-end mill tool or a cutting point on the end face of the flat end mill tool.

12. A numerical controller for controlling a machine tool having a plurality of linear-motion axes and at least one rotational-motion axis for a workpiece holding stock to which a workpiece is fixed, said controller comprising:

motion commanding means for providing a command of motion path for said linear-motion axes, a command of velocity of said tool with respect to said workpiece, and a command of rotational motion of the rotational-motion axis for defining an orientation of said tool with respect to said workpiece holding stock;

coordinate system defining means for defining a coordinate system with respect to said workpiece holding stock;

first interpolation means for performing interpolation on the commanded motion path using the commanded velocity in said coordinate system to obtain interpolated position data for said linear-motion axes;

second interpolation means for interpolating the rotational motion of said rotational-motion axis based on the commanded motion path and the commanded velocity to obtain interpolated position data for the rotational-motion axis; and correction means for correcting the interpolated position data obtained by said first interpolation means based on the interpolated position data for the rotational-motion axis, wherein motion commands for the linear-motion axes are outputted based on the interpolated position data for the linear-motion axes corrected by said correction means, and motion commands for the rotational-motion axis are outputted based on the interpolated position data for the rotational-motion axis so that a tool center point set to the tool is moved along the commanded motion path at the commanded velocity.

* * * * *